United States Patent
Tamaru (10) Patent No.: US 11,066,045 B2
(45) Date of Patent: Jul. 20, 2021

(54) AUTHENTICATION SYSTEM AND AUTHENTICATION TARGET DEVICE

(71) Applicant: DENSO CORPORATION, Kariya (JP)

(72) Inventor: Tomonaga Tamaru, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/828,012

(22) Filed: Mar. 24, 2020

(65) Prior Publication Data

US 2020/0223394 A1 Jul. 16, 2020

Related U.S. Application Data

(63) Continuation of application No. PCT/JP2018/031805, filed on Aug. 28, 2018.

(30) Foreign Application Priority Data

Oct. 9, 2017 (JP) .............................. JP2017-196481

(51) Int. Cl.
| | |
|---|---|
| *B60R 25/24* | (2013.01) |
| *H02J 50/20* | (2016.01) |
| *B60R 25/40* | (2013.01) |
| *H04L 5/00* | (2006.01) |
| *H04W 12/06* | (2021.01) |

(52) U.S. Cl.
CPC .............. *B60R 25/24* (2013.01); *B60R 25/40* (2013.01); *H02J 50/20* (2016.02); *H04L 5/0055* (2013.01); *H04W 12/06* (2013.01)

(58) Field of Classification Search
CPC combination set(s) only.
See application file for complete search history.

(56) References Cited

U.S. PATENT DOCUMENTS

2017/0327086 A1 11/2017 Katou

FOREIGN PATENT DOCUMENTS

| JP | 2006070624 A | 3/2006 |
|---|---|---|
| JP | 2016108826 A | 6/2016 |

*Primary Examiner* — Nabil H Syed
*Assistant Examiner* — Cal J Eustaquio
(74) *Attorney, Agent, or Firm* — Harness, Dickey & Pierce, P.L.C.

(57) ABSTRACT

An authentication system includes an authentication target device used in an authentication target and a plurality of portable devices each carried by a user. The authentication target device performs wireless communication with each of the plurality of portable devices and controls the authentication target by a verification via the wireless communication. The authentication target device includes an authentication target transmitter configured to transmit a radio wave carrying a signal, an authentication target receiver configured to receive a radio wave carrying a signal, and a registration unit configured to register the plurality of portable devices that are genuine. Each of the plurality of portable devices includes a portable device transmitter configured to transmit the radio wave carrying the signal and a portable device receiver configured to receive the radio wave carrying the signal.

7 Claims, 7 Drawing Sheets

AUTHENTICATION SYSTEM AND AUTHENTICATION TARGET DEVICE

CROSS REFERENCE TO RELATED APPLICATIONS

The present application is a continuation application of International Patent Application No. PCT/JP2018/031805 filed on Aug. 28, 2018, which designated the U.S. and claims the benefit of priority from Japanese Patent Application No. 2017-196481 filed on Oct. 9, 2017. The entire disclosures of all of the above applications are incorporated herein by reference.

TECHNICAL FIELD

The present disclosure relates to an authentication system that permits control of an authentication target according to a result of verification using wireless communication between an authentication target device used in the authentication target and a portable device carried by a user. The present disclosure also relates to the authentication target device used for the authentication system.

BACKGROUND

An authentication system that locks and unlocks a door of a vehicle or the like has been proposed. For example, in the authentication system, the lock or unlock is performed according to a result of verification using wireless communication between a mobile device carried by a user and an in-vehicle device. In such an authentication system, the in-vehicle device transmits a Wake signal for activating the mobile device to the mobile device prior to transmission of a Challenge signal for cryptographic communication. When the mobile device receives the Wake signal, the mobile device returns an Ack signal to the in-vehicle device.

SUMMARY

The present disclosure provides an authentication system. The authentication system includes an authentication target device used in an authentication target and a plurality of portable devices each carried by a user. The authentication target device performs wireless communication with each of the plurality of portable devices and controls the authentication target by a verification via the wireless communication. The authentication target device includes an authentication target transmitter configured to transmit a radio wave carrying a signal, an authentication target receiver configured to receive a radio wave carrying a signal, and a registration unit configured to register the plurality of portable devices that are genuine. Each of the plurality of portable devices includes a portable device transmitter configured to transmit the radio wave carrying the signal and a portable device receiver configured to receive the radio wave carrying the signal.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

For example, multiple genuine mobile devices may be registered in an in-vehicle device. In this case, a return time point of an Ack signal in response to a Wake signal transmitted from the in-vehicle device is different between the multiple mobile devices in order to specify which registered mobile device has returned the Ack signal. The method is known as a slot system.

For example, a function such as a welcome function is applied to the vehicle. In the welcome function, a light is turned on when a user carrying a mobile device approaches a vehicle. Accordingly, when the vehicle is parked, the in-vehicle device periodically transmits the Wake signal to determine the presence or absence of the mobile device. Since it is necessary to reduce the dark current when the vehicle is parked, the current consumption of the wireless communication of the Wake signal and the Ack signal during parking needs to be minimized.

In the slot system, after transmitting the Wake signal, the in-vehicle device needs to cause a reception circuit of the in-vehicle device for receiving the Ack signal to keeps being activated until the return time points of all the registered portable devices end. Thus, the in-vehicle device may increase the current consumption. A simultaneous system may be used instead of the slot system. In the simultaneous system, each registered mobile device returns the Ack signal in response to the reception of the Wake signal. However, in the simultaneous system, when the multiple mobile devices exist within the communication range of the in-vehicle device, waveforms of the Ack signals from the multiple mobile devices may overlap with each other. Thus, there is a possibility that the in-vehicle device cannot accurately receive the Ack signals.

The present disclosure provides an authentication system and an authentication target device each ensures communication reliability and reduces current consumption.

An example embodiment of the present disclosure provides an authentication system. The authentication system includes an authentication target device and a plurality of portable devices. The authentication target device is used in an authentication target. Each of the plurality of portable devices is carried by a user. The authentication target device performs wireless communication with the plurality of portable devices and performs authentication for controlling the authentication target via the wireless communication. The authentication target device includes an authentication target transmitter, an authentication target receiver, and a registration unit. The authentication target transmitter transmits a radio wave carrying a signal. The authentication target receiver receives a radio wave carrying a signal. The registration unit registers the plurality of portable devices that are genuine. The authentication target transmitter transmits a Wake signal for activating the plurality of portable devices prior to the verification. The authentication target receiver is activated in response to the authentication target transmitter transmitting the Wake signal. Each of the plurality of portable devices includes a portable device transmitter and a portable device receiver. The portable device transmitter transmits the radio wave carrying the signal. The portable device receiver receives the radio wave carrying the signal. The portable device transmitter returns an Ack signal as an acknowledgment in response to the portable device receiver receiving the Wake signal. The portable device transmitter switches between a slot system and a simultaneous system. In the slot system, the plurality of portable devices registered in the registration unit are given slot return time points for returning the Ack signals in response to the Wake signal at different time points. In the simultaneous system, the plurality of portable devices registered in the registration unit are given a simultaneous return time point for returning the Ack signals in response to the Wake signal at a same time point. The Wake signal includes a first Wake signal, which includes designation information designating each of the plurality of portable devices to return the Ack signal in the simultaneous system and a second Wake signal, which includes designation information designating each of the plurality of portable devices to return the Ack signal in the slot system. A period from reception of the first Wake signal to the simultaneous return time point is shorter than a period from reception of the second Wake signal to a last one of the slot return time points. As transmission of the Wake signal for activating the plurality of portable devices, (i) when the authentication target receiver does not receive the radio wave in response to the transmission of the first Wake signal, an operation of the authentication target receiver is stopped and the authentication target transmitter refrains from transmitting the second Wake signal, and (ii) when the authentication target receiver receives the radio wave in response to the transmission of the first Wake signal, the authentication target transmitter transmits the second Wake signal. When the portable device receiver receives the first Wake signal, the portable device transmitter transmits the Ack signal at the simultaneous return time point. When the portable device receiver receives the second Wake signal, the portable device transmitter transmits the Ack signal at a given time point among the slot return time points.

In the exemplary embodiment of the present disclosure, the authentication target transmitter first transmits the first Wake signal. When the authentication target receiver does not receive the radio wave in response to the first Wake signal, the operation of the authentication target receiver is stopped. Thus, when the portable device does not exist within the communication range of the authentication target transmitter, the operation of the authentication target receiver can be stopped at a time point that exceeds the simultaneous return time point. Thus, the configuration can shorten the period for which the authentication target receiver operates and reduce the current consumption compared with a configuration that stops the operation of the authentication target receiver at the time when all the slot return time points for the registered genuine multiple portable devices exceed. When the authentication target receiver receives the radio wave, the authentication target transmitter transmits the second Wake signal. The configuration can reduce the overlap of the waveforms of the Ack signals returned from the plurality of portable devices. Thus, the authentication target device can receive the Ack signal more accurately. As a result, it is possible to ensure the communication reliability and further reduce the current consumption.

Another example embodiment of the present disclosure provides an authentication target device. The authentication target device is used in an authentication target, is configured to perform wireless communication with a plurality of portable devices each carried by a user, and is configured to control the authentication target by a verification via the wireless communication. The authentication target device includes an authentication target transmitter, an authentication target receiver, and a registration unit. The authentication target transmitter transmits a radio wave carrying a signal. The authentication target receiver receives a radio wave carrying a signal returned from each of the plurality of portable devices in response to the authentication target transmitter transmitting the signal carried by the radio wave. The registration unit registers the plurality of portable devices that are genuine. The authentication target transmitter transmits a Wake signal for activating the plurality of portable devices prior to the verification. The authentication target receiver is activated in response to the authentication target transmitter transmitting the Wake signal. The Wake signal includes a first Wake signal, which includes designation information designating each of the plurality of portable devices to return, as an acknowledgment, an Ack signal in a simultaneous system, and a second Wake signal, which includes designation information designating each of the plurality of portable devices to return the Ack signal in a slot system. In the slot system, the plurality of portable devices registered in the registration unit are given slot return time points for returning the Ack signals in response to the Wake signal at different time points. In the simultaneous system, the plurality of portable devices registered in the registration unit are given a simultaneous return time point for returning the Ack signals in response to the Wake signal at a same time point. A period from reception of the first Wake signal to the simultaneous return time point is shorter than a period from reception of the second Wake signal to a last one of the slot return time points. As transmission of the Wake signal for activating the plurality of portable devices, (i) when the authentication target receiver does not receive the radio wave in response to the transmission of the first Wake signal, an operation of the authentication target receiver is stopped and the authentication target transmitter refrains from transmitting the second Wake signal, and (ii) when the authentication target receiver receives the radio wave in response to the transmission of the first Wake signal, the authentication target transmitter transmits the second Wake signal.

In another exemplary embodiment of the present disclosure, the authentication target transmitter first transmits the first Wake signal. When the authentication target receiver does not receive the radio wave in response to the first Wake signal, the operation of the authentication target receiver is stopped. Thus, when the portable device does not exist within the communication range of the authentication target transmitter, the operation of the authentication target receiver can be stopped at a time point that exceeds the simultaneous return time point. Thus, the configuration can shorten the period for which the authentication target receiver operates and reduce the current consumption compared with a configuration that stops the operation of the authentication target receiver at the time when all the slot return time points for the registered genuine multiple portable devices exceed. When the authentication target receiver receives the radio wave, the authentication target transmitter transmits the second Wake signal. The configuration can reduce the overlap of the waveforms of the Ack signals returned from the plurality of portable devices. Thus, the authentication target device can receive the Ack signal more accurately. As a result, it is possible to ensure the communication reliability and further reduce the current consumption.

Multiple embodiments will be described for disclosure hereinafter with reference to the drawings. For convenience of description, the same reference numerals are assigned to portions having the same functions as those shown in the drawings used in the description so far among the plurality of embodiments, and a description of the same portions may be omitted. Description in another applicable embodiment may be referred to for such a portion denoted by the identical reference sign.

First Embodiment

Figure 1:
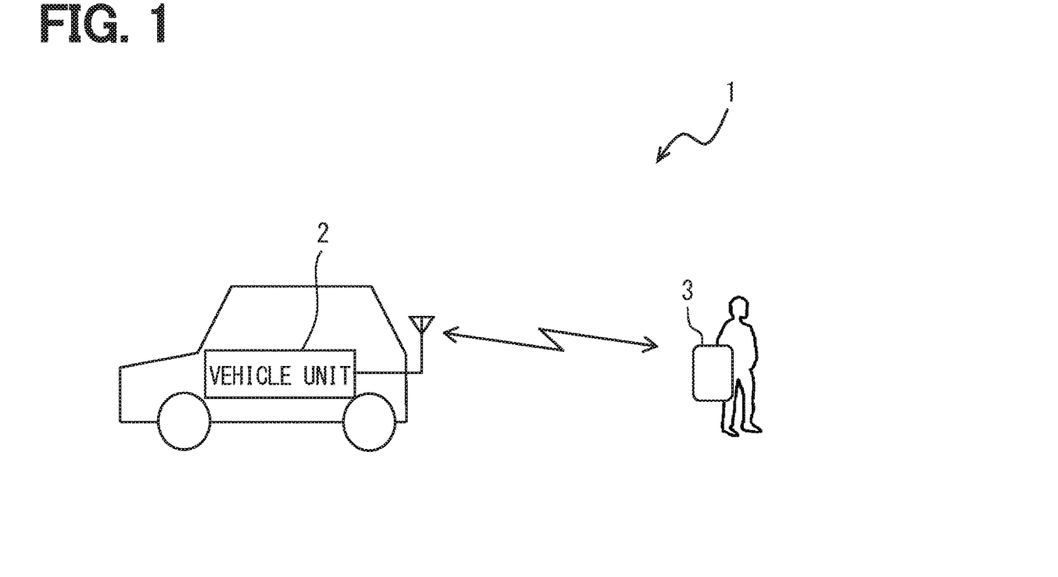
FIG. 1 is a diagram showing an example of a schematic configuration of an authentication system.

The first embodiment of the present disclosure is described with reference to the drawings. As shown in FIG. 1, an authentication system 1 includes a vehicle unit 2 used in a vehicle and a portable device 3 carried by a user. This vehicle corresponds to an authentication target. The authentication system 1 performs verification by short-range wireless communication between the vehicle unit 2 and the portable device 3. When the verification is established, permission to lock and unlock the vehicle door, permission to start the traveling drive source, turning on of various lights, opening of a PSD (power slide door), locking of the PSD, or the like is performed.

Figure 2:
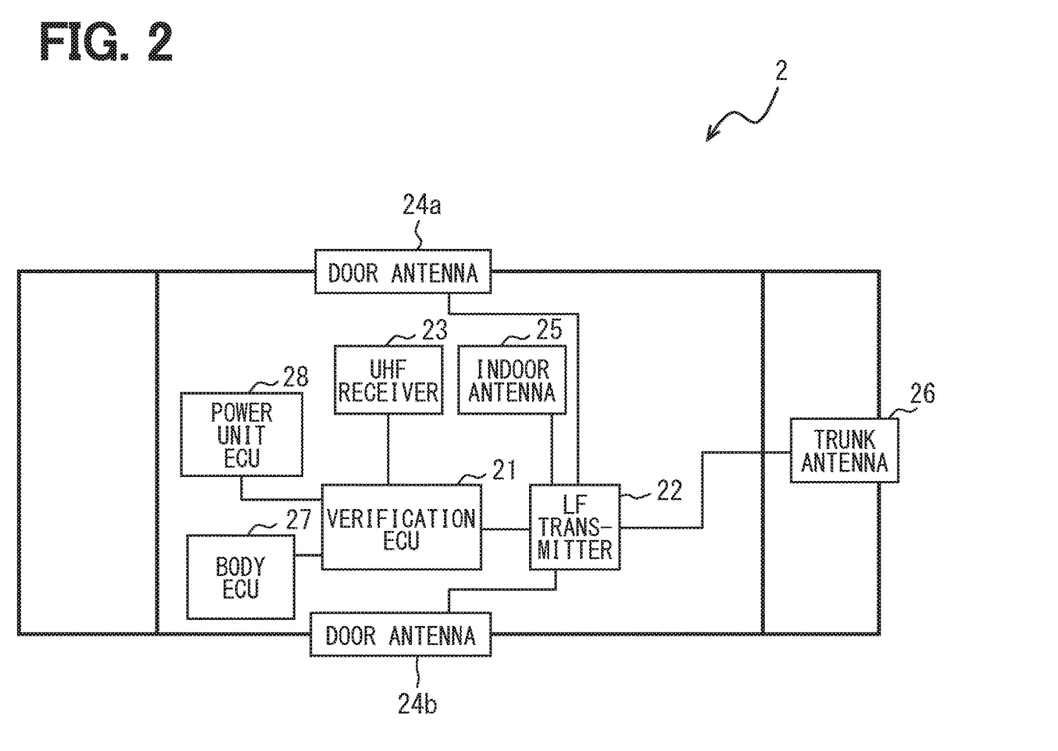
FIG. 2 is a diagram showing an example of a schematic configuration of a vehicle unit.

With reference to FIG. 2, a schematic configuration of the vehicle unit 2 will be described. FIG. 2 is a diagram showing the schematic configuration of the vehicle unit 2. As shown in FIG. 2, the vehicle unit 2 includes a verification ECU 21, an LF transmitter 22, a UHF receiver 23, door antennas 24a and 24b, an indoor antenna 25, a trunk antenna 26, a body ECU 27, and a power unit ECU 28.

The LF transmitter 22 is provided by a transmission circuit that transmits a signal on a LF band radio wave to the portable device 3 via a LF antenna, such as the door antenna 24a and 24b, the indoor antenna 25, or the trunk antenna 26. The LF transmitter 22 corresponds to an authentication target transmitter. The LF band may be a frequency band from 30 kHz to 300 kHz. The LF antenna has a communication range for transmitting a signal of radio wave in the LF band. The communication range corresponds to a short-range wireless communication area in which the LF antenna is capable of performing short-range wireless communication. The LF transmitter 22 is also referred to as an authentication target transmission circuit.

The door antenna 24a is provided close to a vehicle door by the driver's seat. The door antenna 24b is provided close to the vehicle door by the passenger's seat. The indoor antenna 25 is provided in the vehicle compartment. The trunk antenna 26 is provided close to a door of trunk room. The LF antenna may include at least one of the above-described antennas, or may include another antenna in another part of the vehicle.

The short-range wireless communication area of the door antenna 24a is limited to the vicinity of the vehicle door by the driver's seat. The short-range wireless communication area of the door antenna 24b is limited to the vicinity of the vehicle door by the passenger's seat. The short-range wireless communication area of the indoor antenna 25 is limited to the inside of the vehicle. The short-range wireless communication area of the trunk antenna 26 is limited to the vicinity of the door of trunk room. The short-range wireless communication area of each of the door antennas 24a and 24b and the trunk antenna 26 extends outside the vehicle compartment. Each of the door antennas 24a and 24b and the trunk antenna 26 corresponds to an antenna. The present embodiments and modifications discloses a vehicle for an area where a left-hand traffic is legislated. When the present embodiments and modifications are to be applied to a vehicle for an area where a right-hand traffic is legislated, the driver's seat and the passenger seat will be reversed.

The UHF receiver 23 has a UHF antenna. The UHF receiver 23 is provided by a reception circuit that receives a signal of UHF band radio wave transmitted from the portable device 3 by the UHF antenna. The UHF receiver 23 corresponds to an authentication target receiver. The UHF band may be a frequency band from 300 MHz to 3 GHz. The UHF receiver 23 is also referred to as an authentication target reception circuit.

The body ECU 27 is provided by an electronic control device that controls lighting such as a headlight, a small light, a tail light, or an interior light, and controls locking and unlocking of a door. The body ECU 27 may lock and unlock each vehicle door by transmitting a drive signal for controlling locking and unlocking of each vehicle door to a door lock motor provided in each vehicle door. The body ECU 27 is connected to a touch sensor provided on an outer door handle of each vehicle door. The body ECU 27 detects a touch of the user to the outer door handle of each vehicle door using the touch sensor. The body ECU 27 is connected to a courtesy switch for each vehicle door. The body ECU 27 detects an open or close of each vehicle door using the courtesy switch. The body ECU 27 is connected to a seat sensor. The body ECU 27 detects whether an occupant is seated in a seat.

The power unit ECU 28 is provided by an electronic control device that controls an internal combustion engine or a motor generator of the vehicle. The power unit ECU 28 receives a start permission signal to start the travel drive source from the verification ECU 21 and then causes the internal combustion engine or the motor generator of the vehicle to be ready to start.

The verification ECU 21 includes a processor, a memory, an I/O, and a bus that connects those devices, and executes various processes related to the authentication in the vehicle by executing a control program stored in the memory. The memory referred to herein is a non-transitory tangible storage medium configured to non-temporarily store a program and data readable by a computer. The non-transitory tangible storage medium is embodied by a semiconductor memory or a magnetic disk.

Figure 3:
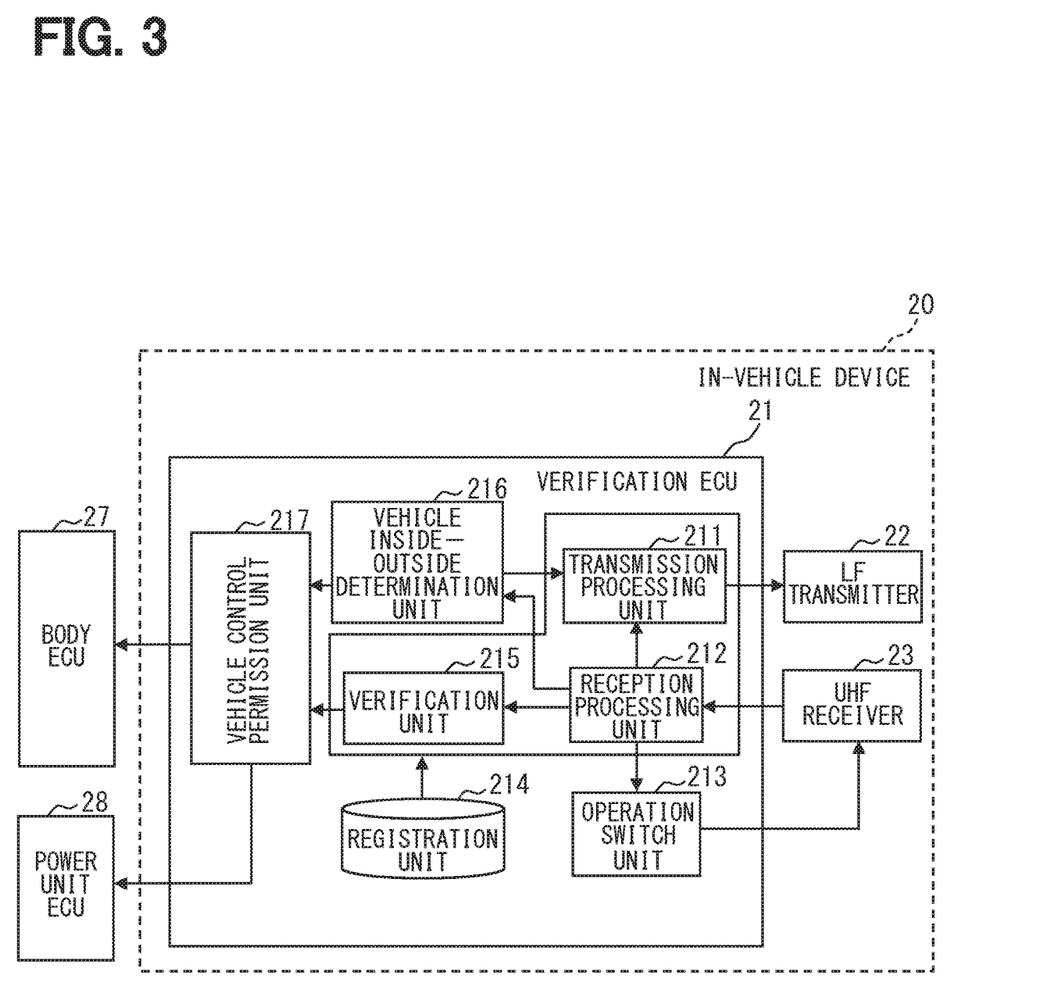
FIG. 3 is a diagram showing an example of a schematic configuration of a verification ECU.

The verification ECU 21 will be described next in terms of a schematic configuration thereof with reference to FIG. 3. As shown in FIG. 3, the verification ECU 21 includes a transmission processing unit 211, a reception processing unit 212, an operation switch unit 213, a registration unit 214, a verification unit 215, a vehicle inside-outside determination unit 216, and a vehicle control permission unit 217 as functional blocks. An in-vehicle device 20 includes the verification ECU 21, the LF transmitter 22, and the UHF receiver 23. The in-vehicle device 20 corresponds to an authentication target device. In addition, a part or all of the functions executed by the verification ECU 21 may be configured in hardware with one or more ICs or the like.

Alternatively, some or all of the functional blocks of the verification ECU 21 may be implemented by a combination of software executed by a processor and hardware.

The transmission processing unit 211 causes the LF transmitter 22 to transmit a signal from the door antennas 24*a* and 24*b*, the indoor antenna 25, or the trunk antenna 26. The transmission processing unit 211 may cause the LF transmitter 22 to transmit a Wake signal, a Challenge signal, or the like. The Wake signal is a signal for transition of the portable device 3 from a sleep state to a wake-up state. The Challenge signal is a signal for cryptographic communication, and includes a code of random number. The reception processing unit 212 acquires, from the UHF receiver 23, the signal transmitted from the portable device 3 by the UHF band radio wave and received by the UHF receiver 23.

When the vehicle is parked, the transmission processing unit 211 performs polling before causing the LF transmitter 22 to transmit the Challenge signal in order that the verification unit 215 performs the verification. In the polling, the transmission processing unit 211 periodically causes the LF transmitter 22 to transmit the Wake signal to wait for a return of the Ack (Acknowledgement) signal from the portable device 3. The parking of the vehicle may be specified from a vehicle speed detected by a vehicle speed sensor, a switch signal of a parking brake, a shift position detected by a shift position sensor, or the like. The Ack signal is an acknowledgment from the portable device 3 in response to the reception of the Wake signal. The polling cycle may be about 240 to 720 msec. The transmission processing unit 211 causes the LF transmitter 22 to transmit the Challenge signal when the UHF receiver 23 receives the Ack signal in response to the Wake signal.

When the transmission processing unit 211 causes the LF transmitter 22 to transmit the Wake signal, the transmission processing unit 211 adds a vehicle identification code and designation information to the Wake signal. The vehicle identification code is a code for the portable device 3 to identify the vehicle that transmits the Wake signal. The designation information designates a return time point for the return of the Ack signal from the portable device 3. The designation information designates a slot system or a simultaneous system. The vehicle identification code corresponds to identification information. The wake signal that includes designation information designating each of the plurality of portable devices to return the Ack signal in the simultaneous system is referred to as a first Wake signal. The wake signal that includes designation information designating each of the plurality of portable devices to return the Ack signal in the slot system is referred to as a second Wake signal.

In the slot system, the return time point of the Ack signal in response to the Wake signal is different among the multiple genuine portable devices 3 registered in the registration unit 214. The return time point for each portable device 3 may be stored in a registration unit 311 of each portable device 3, which will be described later, when the portable device 3 is registered in the registration unit 214. A time difference between two of the return time points of the portable devices 3 is equal to or longer than a predetermined time. The predetermined time corresponds to a time difference that refrains overlapping waveforms of the Ack signals of portable devices 3 received by the UHF receiver 23 and is estimated that it is possible to accurately receive individual Ack signals when the Ack signals are returned from the multiple portable devices 3 existing within the communication range of the LF antenna. The return time point in the slot system is also referred to as a slot return time point.

In the simultaneous system, the return time points of the Ack signals in response to the Wake signal are the same between the multiple genuine portable devices 3 registered in the registration unit 214. The return time point in the simultaneous system is also referred to as a simultaneous return time point. That is, a period from reception of the first Wake signal to the simultaneous return time point is shorter than a period from reception of the second Wake signal to a last one of the slot return time points. For example, the time point in the simultaneous system is set to be earlier than the second earliest time point in the slot system. In this case, when the number of the portable devices 3 registered in the registration unit 214 is minimum two, the time point in the simultaneous system is earlier than the last time point in the slot system.

When transmitting the Wake signal, the transmission processing unit 211 first causes the LF transmitter 22 to transmit the Wake signal including the designation information designating the simultaneous system. When the UHF receiver 23 receives the radio wave in response to the Wake signal, the transmission processing unit 211 causes the LF transmitter 22 to transmit the Wake signal including the designation information designating the slot system. Here, the term "radio wave" indicates not only a radio wave capable of being received as the Ack signal but also a radio wave incapable of being received as the Ack signal due to overlapping waveforms of Ack signals from the multiple portable devices 3. When the radio wave intensity is equal to or less than a threshold value, the UHF receiver 23 may determine that the radio wave is not received. Thus, the influence of noise may be reduced.

When the UHF receiver 23 receives the Ack signal in response to the Wake signal including the designation information designating the slot system, the reception processing unit 212 determines which portable device 3 transmits the Ack signal based on the return time point of the Ack signal for each portable device 3 registered in the registration unit 214.

The operation switch unit 213 switches the operation of the UHF receiver 23. For example, the operation switch unit 213 activates the UHF receiver 23 every polling cycle. That is, when the LF transmitter 22 transmits the Wake signal, the UHF receiver 23 is activated. When the UHF receiver 23 receives any radio wave in response to the Wake signal including the designation information designating the simultaneous system, the UHF receiver 23 is keep activated. When the UHF receiver 23 does not receive the radio wave in response to the Wake signal including the designation information designating the simultaneous system, the operation of the UHF receiver 23 is stopped. For example, the operation switch unit 213 may stop the operation of the UHF receiver 23 by turning off a power supply for supplying power to the UHF receiver 23. The UHF receiver 23 may be activated by the turn on of the power supply.

The registration unit 214 may be provided by an electrically rewritable non-volatile memory, and store an identifier (hereinafter, mobile ID) for identifying a portable device registered as the genuine portable device 3. In the present embodiment, a case where the registration unit 214 registers the mobile IDs of multiple portable devices 3 as the genuine portable devices 3 will be described as an example. The registration unit 214 stores the return time point for the Ack signal in response to the Wake signal, which is unique to each of the multiple portable devices 3 registered as the genuine portable device 3. Further, the registration unit 214 stores a secret key used in the common key cryptosystem.

When the reception processing unit 212 receives, through UHF receiver 23, the Response signal transmitted from the portable device 3 in response to the Challenge signal transmitted from the LF transmitter 22, the verification unit 215 performs the verification using the Response signal. The Response signal is a signal of an encryption code, that is, the code of the Challenge signal transmitted from the LF transmitter 22 is encrypted by the secret key stored in the portable device 3. The secret key stored in the portable device 3 is common to the secret key stored in the registration unit 214. The verification unit 215 compares the encryption code with the encryption code of the Response signal received from portable device 3.

The vehicle inside-outside determination unit 216 determines whether the portable device 3 is located inside or outside the vehicle compartment. For example, when the Wake signal is transmitted from the indoor antenna 25, the Ack signal is received by the portable device 3, so that the vehicle inside-outside determination unit 216 determines that the portable device 3 is located inside the vehicle compartment. On the other hand, when the Wake signal is transmitted from one of the door antennas 24a to 24b or the trunk antenna 26, the Ack signal is received from the portable device 3, but when the Wake signal is transmitted from the indoor antenna 25, the Ack signal is not received from the portable device 3. In this case, the vehicle inside-outside determination unit 216 determines that the portable device 3 is located outside the vehicle compartment.

When the inside-outside determination unit 216 determines that the portable device 3 is located outside the vehicle compartment and the verification unit 215 succeeds in the verification, that is, when the vehicle outside verification is established, the vehicle control permission unit 217 transmits a signal to permit the locking or unlocking of each vehicle door to the body ECU 27. When the locking and unlocking of each vehicle door is permitted, the body ECU 27 starts energizing the touch sensor provided on the outer door handle of each vehicle door and enters a standby state in which the door handle operation by the user can be detected. When the body ECU 27 detects that the user touches the touch sensor, the body ECU 27 transmits the drive signal to a door lock motor, and automatically locks and unlocks each vehicle door. When the body ECU 27 detects that the user touches the touch sensor while the PSD is closed, the body ECU 27 reserves the locking of each vehicle door, and the locking of each vehicle door is automatically performed after the PSD is closed.

In addition, when the outside verification is established, the vehicle control permission unit 217 notifies the body ECU 27 that the outside verification is established and the body ECU 27 automatically turns on the light according to whether the user gets on or off the vehicle. For example, when the user gets on the vehicle, the body ECU 27 automatically turns on the lighting such as a small lamp, a vehicle interior light, or the like. When the user gets off the vehicle, the body ECU 27 automatically turns off the lighting such as the headlight or the like after a predetermined time period. The body ECU 27 may specify the occupant's getting off of the vehicle based on the detection result of the seat sensor of the presence or absence of the occupant in the seat, the detection result of the door courtesy switch of the opening or closing of the vehicle door, or the like. The body ECU 27 may specify the occupant's getting on of the vehicle by establishing outside verification after the vehicle door is locked.

Further, when the outside vehicle verification is established, the vehicle control permission unit 217 causes the body ECU 27 to automatically release the PSD in which a reservation setting has been performed by the portable device 3. The reservation setting may be performed by receiving an operation input for selecting the PSD to be automatically opened by an operation input unit 34 of the portable device 3 described later. When the portable device 3 and the in-vehicle device 20 perform wireless communication for the verification, the verification ECU 21 verifies that the reservation setting is performed by acquiring information that reservation setting is performed from the portable device 3.

When the inside-outside determination unit 216 determines that the portable device 3 is located inside the vehicle compartment and the verification unit 215 succeeds in the verification, that is, when the vehicle inside verification is established, the vehicle control permission unit 217 transmits a start permission signal for the drive source to the power unit ECU 28. The power unit ECU 28 that obtains the start permission signal sets the internal combustion engine or the motor generator of the vehicle in a state to be started as described above.

Figure 4:
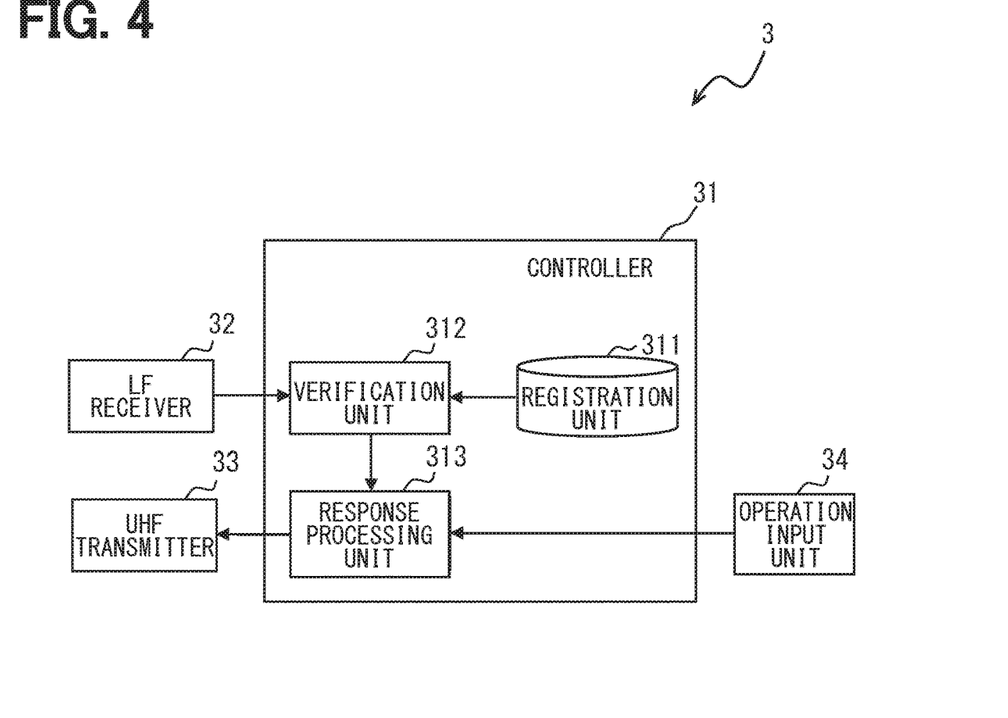
FIG. 4 is a diagram showing an example of a schematic configuration of a portable device.

The portable device 3 will be described next with reference to FIG. 4. As shown in FIG. 4, the portable device 3 includes a controller 31, an LF receiver 32, a UHF transmitter 33, and an operation input unit 34. The portable device 3 may be provided by an electronic key of the vehicle.

The LF receiver 32 receives a signal transmitted from the in-vehicle device 20 on the LF band radio wave via the LF antenna. The LF receiver 32 corresponds to a portable device receiver. The UHF transmitter 33 transmits a signal transmitted from the controller 31 on the UHF band radio wave via the UHF antenna. The UHF transmitter 33 corresponds to a portable device transmitter. The operation input unit 34 receives an operation input from the user. As an example, the operation input unit 34 includes a switch for receiving the operation input for the reservation setting described above or the like.

The controller 31 is provided by an IC, a microcomputer, or the like having a processor, a memory, and the like. The controller 31 executes various processes by executing a control program stored in the memory. The memory referred to herein is a non-transitory tangible storage medium configured to non-temporarily store a program and data readable by a computer. The non-transitory tangible storage medium is implemented by a semiconductor memory or the like. The detail of the controller 31 will be described later.

The portable device 3 is in a sleep state until receiving the Wake signal. The sleep state here may represent a state in which the controller 31 is stopped by stopping the supply of the operation clock signal and some of ports for receiving the Wake signal are operating. When the portable device 3 receives the Wake signal, the portable device 3 enters an activation state in which a clock signal for the operation is supplied to the controller 31 so as to activate the controller 31. The portable device 3 may shift to the sleep state when the transmission or reception is not performed for a certain period of time.

Here, a schematic configuration of the controller 31 will be described with reference to FIG. 4. As shown in FIG. 4, the controller 31 includes a registration unit 311, a verification unit 312, and a response processing unit 313 as functional blocks. In addition, a part or all of the functions executed by the controller 31 may be configured in hardware with one or more ICs or the like. Alternatively, some or all of the functional blocks of the controller 31 may be implemented by a combination of software executed by a processor and hardware.

The registration unit 311 may be provided by an electrically rewritable nonvolatile memory, and store a vehicle identification code. The registration unit 311 stores the secret key common to the secret key stored in the registration unit 214 of the in-vehicle device 20. In addition, the registration unit 311 stores the return time point in the simultaneous system and the return time point unique to each portable device 3 device in the slot system. The verification unit 312 compares the vehicle identification code included in the Wake signal received by the LF receiver 32 with the vehicle identification code registered in the registration unit 311. Further, when the LF receiver 32 receives the Challenge signal, the verification unit 312 encrypts the Challenge signal using the secret key stored in the registration unit 311 and common to the in-vehicle device 20, and the encryption algorithm common to the in-vehicle device 20. When the encrypted code is generated, the code is transmitted to the response processing unit 313.

When the verification unit 312 establishes the verification, the response processing unit 313 transmits (that is, returns) the Ack signal from the UHF transmitter 33. When the response processing unit 313 returns the Ack signal, the response processing unit 313 switches between returning in the simultaneous system and returning in the slot system based on the designation information included in the Wake signal received by the LF receiver 32. When the designation information designating the simultaneous system, the response processing unit 313 sets the return time point to the return time point in the simultaneous system registered in the registration unit 311. Then, the Ack signal is returned at the return time point in the simultaneous system. On the other hand, when the designation information designating the slot system, the response processing unit 313 sets the return time point to the return time point in the slot system registered in the registration unit 311. Then, the Ack signal is returned at the return time point unique to each portable device 3 in the slot system.

Figure 5:
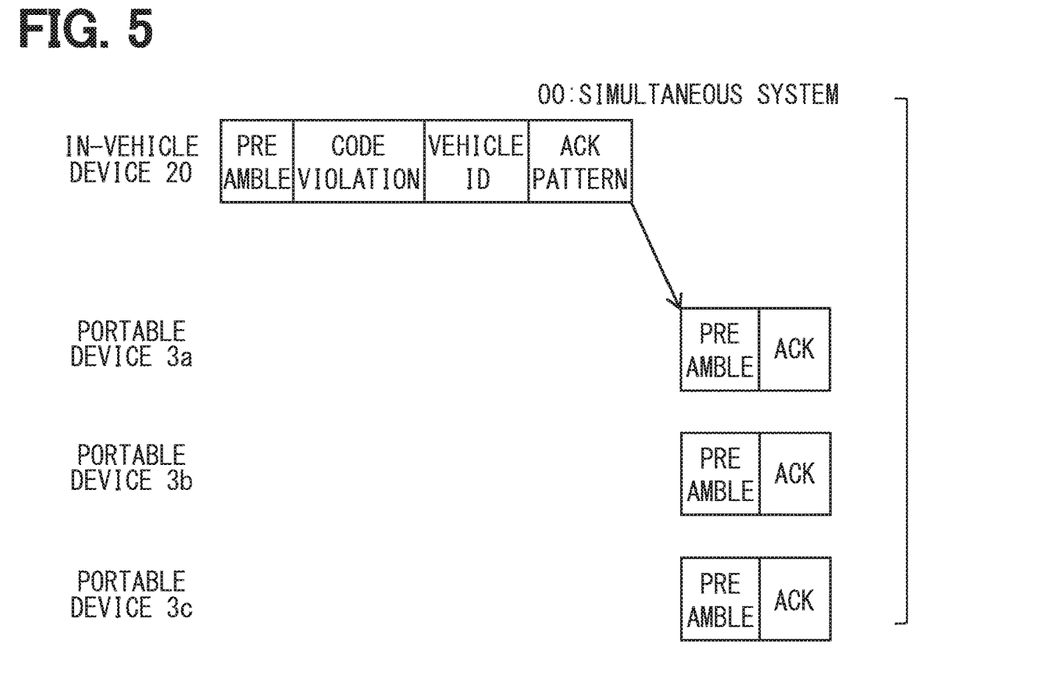
FIG. 5 is a diagram showing an example of a return time point of an Ack signal in response to a Wake signal when designation information designates a simultaneous system.
Figure 6:
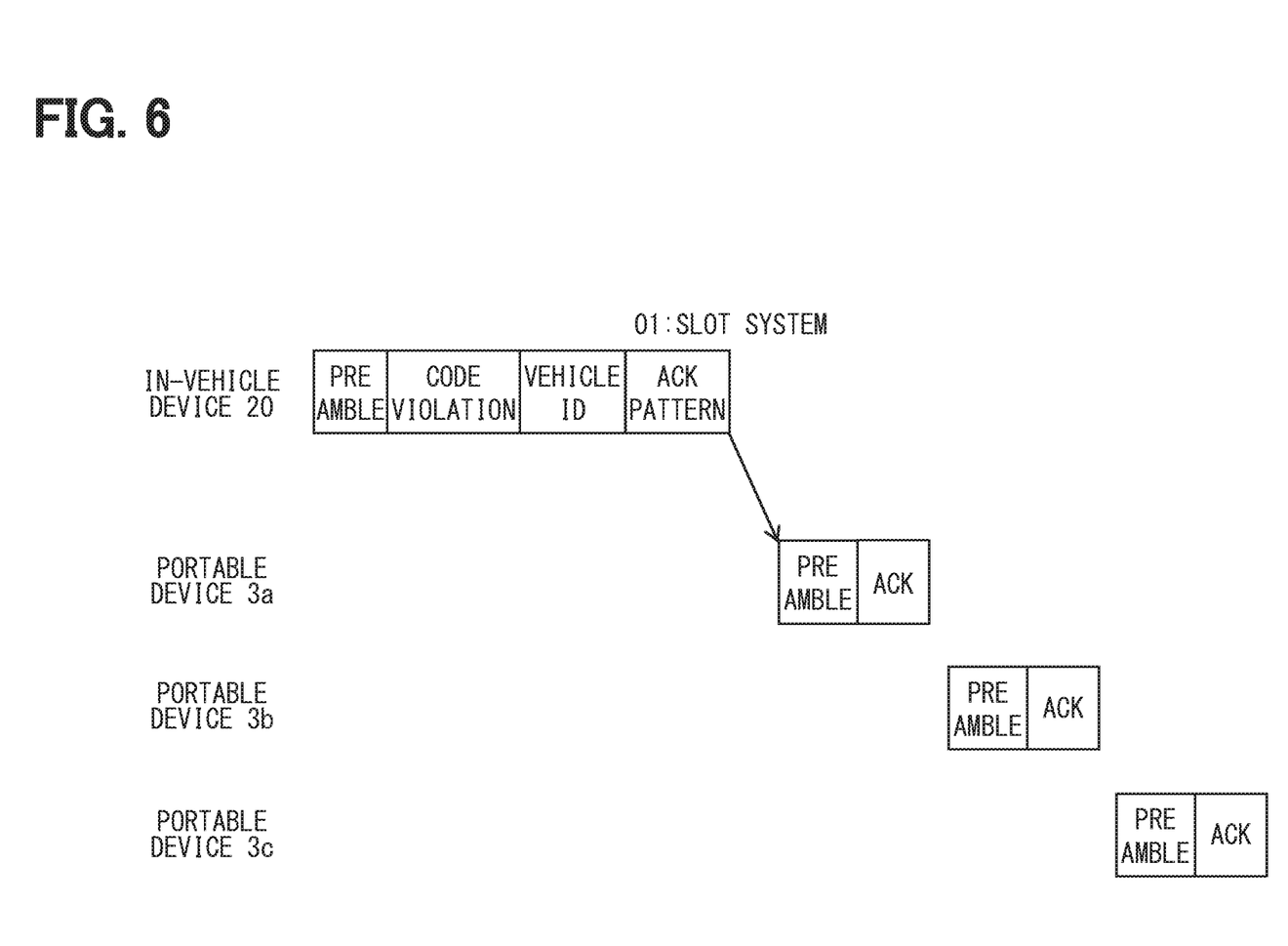
FIG. 6 is a diagram showing an example of a return time point of an Ack signal in response to the Wake signal when designation information designates a slot system.

An example of switching of the return time point in the portable device 3 according to the designation information included in the Wake signal will be described with reference to FIGS. 5 and 6. FIG. 5 shows an example in which the designation information designating the simultaneous system, and FIG. 6 shows an example in which the designation information designating the slot system. In FIGS. 5 and 6, an example will be described in which three genuine portable devices 3 (portable devices 3a to 3c) exist within the communication range of the LF antenna of the vehicle unit 2. In FIGS. 5 and 6, Vehicle ID indicates the vehicle identification code, and Ack Pattern indicates the designation information. The designation information designating the simultaneous system is a 2-bit code "00" and designating the slot system is a 2-bit code "01".

As shown in FIG. 5, when the portable devices 3a to 3c receive the Wake signal transmitted from the in-vehicle device 20 and including the designation information designating the simultaneous system, the portable devices 3a to 3c return the Ack signals in the simultaneous system. Therefore, as shown in FIG. 5, the portable devices 3a to 3c that have received the Wake signal return the Ack signals at the same return time point.

On the other hand, as shown in FIG. 6, when the portable devices 3a to 3c receive the Wake signal transmitted from the in-vehicle device 20 and including the designation information designating the slot system, the portable devices 3a to 3c return the Ack signals in the slot system. Therefore, as shown in FIG. 6, the portable devices 3a to 3c that have received the Wake signal return the Ack signals at the return time points that are different with each other. Thus, the in-vehicle device 20 is capable of receiving Ack signal of each portable devices 3a to 3c at different time points so as not to overlap the waveforms. In addition, the in-vehicle device 20 is capable of receiving the individual Ack signals more accurately. As a result, it is possible to specify which portable device 3 has returned the Ack signal based on the difference in the return time points.

As shown in FIGS. 5 and 6, even when the designation information is different with each other, the frame of the Wake signals are different in the number of the 2-bit code representing the designation information. Thus, the length of the frame is the same even when the designation information is different with each other. In a conventional Wake signal that does not include the designation information, the vehicle identification code is a 16-bit code, whereas in the first embodiment, the vehicle identification code included in the Wake signal is a 14-bit code. Then, the designation information is assigned in two bits, which are part of the bit width of the conventional Wake signal to which the vehicle identification code is assigned. The Wake signal that does not include the designation information is referred as a third Wake signal. As a result, the frame length of the Wake signal including the designation information is the same as that of the conventional Wake signal that does not include the designation information. Therefore, there is an advantage that the same communication protocol as that of the conventional wireless communication used for the verification for permitting the control of the vehicle can be used.

When the verification unit 312 transmits the encrypted code in response to the Challenge signal received by the LF receiver 32, the response processing unit 313 causes the UHF transmitter 33 to transmit the encrypted code.

Figure 7:
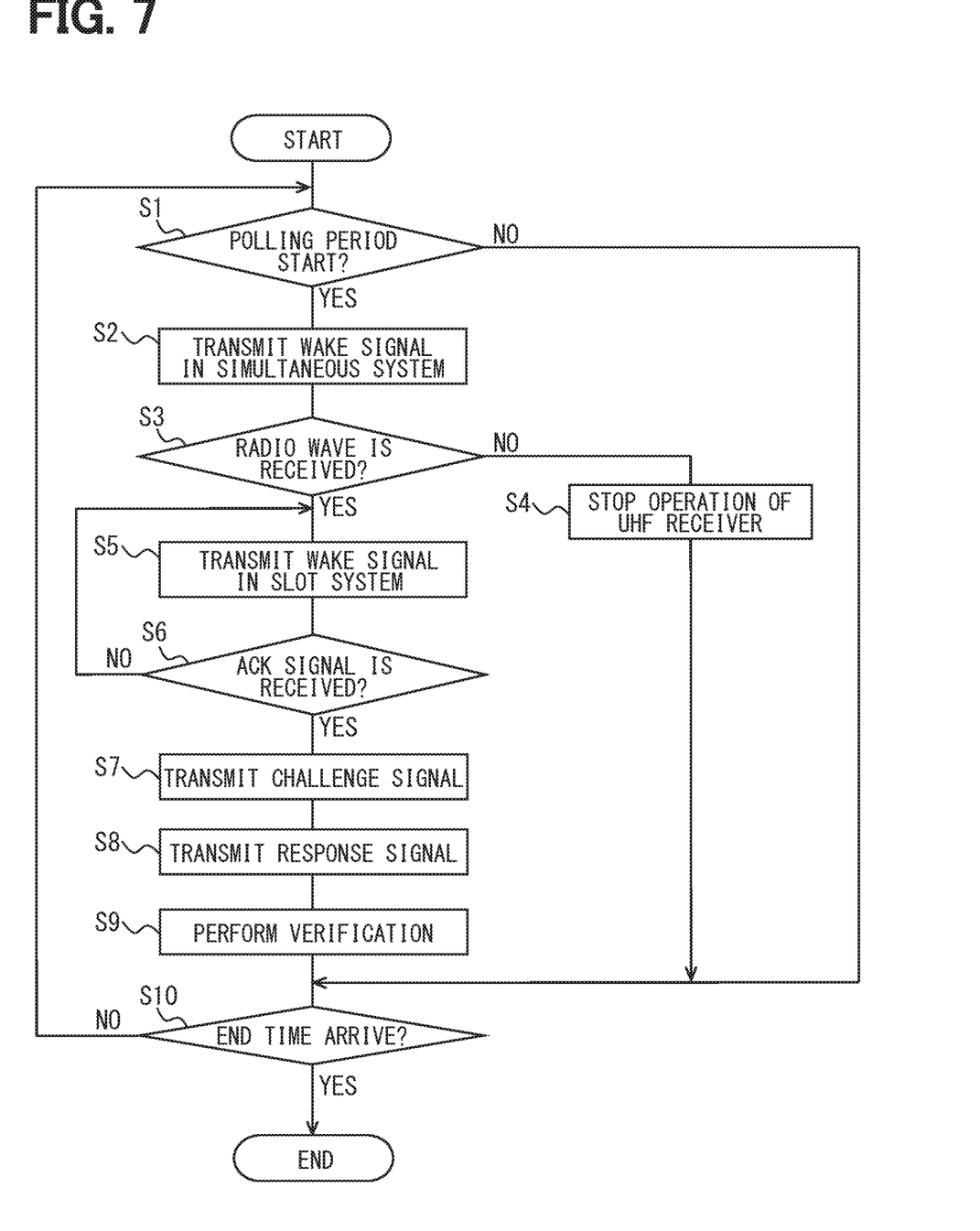
FIG. 7 is a flowchart showing an example of a flow of vehicle authentication processing in an in-vehicle device.

An example of a flow of processing related to the authentication performed by the in-vehicle device 20 (hereinafter referred to as vehicle authentication processing) will be described with reference to a flowchart of FIG. 7. For example, the flowchart in FIG. 7 may start when an ignition power source of the vehicle is turned off.

In S1, when the polling period for periodically transmitting the Wake signal from the LF transmitter 22 is started (YES in S1), the processing proceeds to S2. On the other hand, when the polling cycle is not started (NO in S1), the processing proceeds to S9.

In S2, the transmission processing unit 211 causes the LF transmitter 22 to transmit the Wake signal including the designation information designating the simultaneous system to multiple areas corresponding to the LF antennas of the vehicle unit 2 at the same time. Specifically, the transmission processing unit 211 causes the LF transmitter 22 to transmit a signal from the door antennas 24a and 24b, the indoor antenna 25, and the trunk antenna 26 at the same time. The Wake signal may be transmitted from the indoor antenna 25 at the time of getting off, while the Wake signal may not be transmitted from the indoor antenna 25 at the time of getting on. The identification of whether to get on or off the vehicle may be performed in the same manner as described above. In S2, the operation switch unit 213 activates the UHF receiver 23.

In S3, when the UHF receiver 23 receives any radio wave in response to the Wake signal that is transmitted in S2 and includes the designation information designating the simultaneous system (YES in S3), the processing proceeds to S5. On the other hand, when the UHF receiver 23 does not receive a radio wave (NO in S3), the processing proceeds to S4. Here, the case where the UHF receiver 23 does not receive a radio wave corresponds to a case where the UHF receiver 23 does not receive a radio wave even when the time after transmitting the Wake signal in S2 exceeds a set time. The set time can be set arbitrarily as long as the time is longer than the time estimated to be required for the return when the portable device 3 is located within the communication range of the LF antenna of the vehicle unit 2. Also, when a radio wave of which radio field intensity is equal to or less than a threshold value is received within the set time, it may be determined that the UHF receiver 23 does not receive a radio wave.

In S4, the operation switch unit 213 stops the operation of the UHF receiver 23, and the processing proceeds to S9. In S5, the transmission processing unit 211 causes the LF transmitter 22 to sequentially transmit the Wake signal including the designation information designating the slot system to the area corresponding to each LF antenna of the vehicle unit 2. Specifically, the transmission processing unit 211 causes the LF transmitter 22 to transmit the Wake signal from the door antenna 24a, the door antenna 24b, the indoor antenna 25, and the trunk antenna 26 in this order. The Wake signal may be transmitted from the indoor antenna 25 at the time of getting off, while the Wake signal may not be transmitted from the indoor antenna 25 at the time of getting on. In S5, the operation switch unit 213 causes the UHF receiver 23 to continue to be activated. In S5, the processing may proceed to S6 each time the transmission processing unit 211 causes a different LF antenna to transmit the Wake signal.

In S6, when the UHF receiver 23 receives the Ack signal in response to the Wake signal that is transmitted in S5 and includes the designation information designating the slot system (YES in S6), the processing proceeds to S7. On the other hand, when the UHF receiver 23 does not receive the Ack signal (NO in S6), the processing returns to S5 and repeats the processes. That is, the transmission processing unit 211 repeats the process of transmitting the Wake signal from the LF antenna in the next order and the processing proceeds to S6 until the UHF receiver 23 receives the Ack signal. Here, the case where the UHF receiver 23 does not receive the Ack signal corresponds to a case where the UHF receiver 23 does not receive a signal that is capable being specified as the Ack signal even when the time after transmitting the Wake signal in S2 exceeds the set time.

In S7, the transmission processing unit 211 causes the LF transmitter 22 to transmit the Challenge signal that designates the portable device 3 that has received the Ack signal in S6. The LF antenna that transmits the Challenge signal may be the LF antenna that transmitted the Wake signal corresponding to the Ack signal having been received by the UHF receiver 23.

In S8, the UHF receiver 23 receives the Response signal returned from the portable device 3 in response to the Challenge signal transmitted in S7. In S9, the verification unit 215 encrypts the code of the Challenge signal transmitted in S7 using the common secret key stored in the registration unit 214 and the encryption algorithm common to the portable device 3. Then, the encrypted code is compared with the encrypted code of the Response signal received from the portable device 3, and the processing proceeds to S10. The process when the verification by the verification unit 215 is established is described above.

In S10, when the end time for the vehicle authentication processing arrives (YES in S10), the vehicle authentication processing is terminated. On the other hand, when the end time for the vehicle authentication processing does not arrive (NO in S10), the vehicle authentication processing returns to S1 to repeat the processing. An example of the arrival of the end time of the vehicle authentication processing is when the travel drive source of the vehicle starts.

Figure 8:
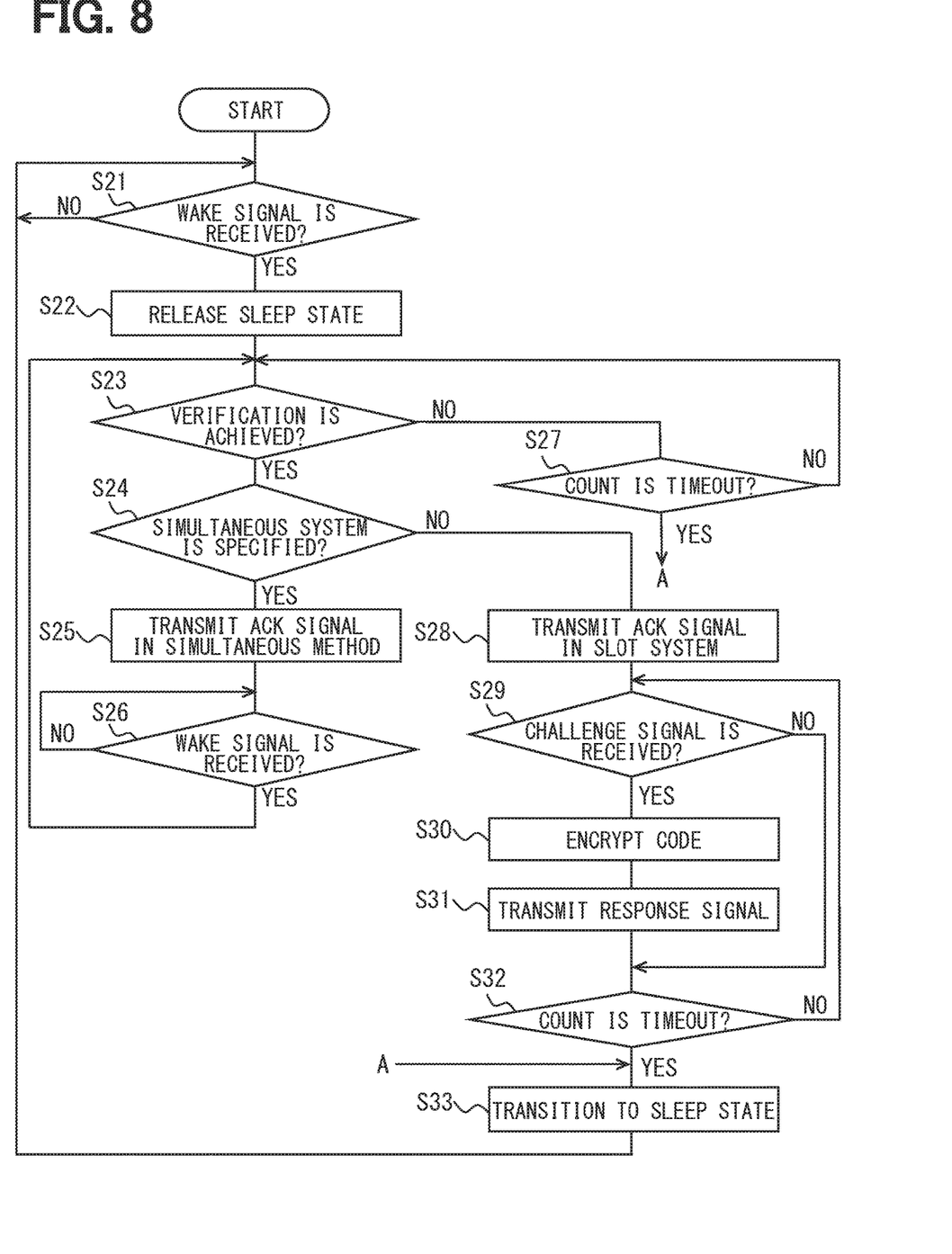
FIG. 8 is a flowchart showing an example of a flow of portable device authentication processing in the portable device.

An example of a flow of processing related to the authentication performed by the portable device 3 (hereinafter referred to as portable device authentication processing) will be described with reference to a flowchart of FIG. 8. For example, the flowchart in FIG. 8 may start when the power supply to the controller 31 of the portable device 3 is started and end when the power supply is stopped.

First, in S21, when the LF receiver 32 receives the Wake signal transmitted from the in-vehicle device 20 (YES in S21), the processing proceeds to S22. On the other hand, the LF receiver 32 does not receive the Wake signal (NO in S21), the processing repeats the process of S21. In S22, the sleep state of the portable device 3 is released. After the sleep state is released, the controller 31 may measure a period during which the UHF transmitter 33 does not perform the transmission after the release of the sleep state using a timer circuit.

In S23, the verification unit 312 compares the vehicle identification code included in the Wake signal received by the LF receiver 32 with the vehicle identification code registered in the registration unit 311. When the verification is established (YES in S23), the processing proceeds to S24. On the other hand, when the verification is not established (NO in S23), the processing proceeds to S27.

In S24, when the designation information included in the Wake signal received by the LF receiver 32 designates the simultaneous system (YES in S24), the processing proceeds to S25. On the other hand, when the designation information included in the Wake signal received by the LF receiver 32 designates the slot system (NO in S24), the processing proceeds to S28.

In S25, the response processing unit 313 sets the return time point in the simultaneous system registered in the registration unit 311, and causes the UHF transmitter 33 to return the Ack signal at the return time point in the simultaneous system. In S26, when the LF receiver 32 receives the Wake signal transmitted from the in-vehicle device 20 again (YES in S26), the processing proceeds to S23. On the other hand, the LF receiver 32 does not receive the Wake signal (NO in S26), the processing repeats the process of S26.

In S27, when the period during which the UHF transmitter 33 does not perform the transmission after the release of the sleep state exceeds a set value, that is, the count is timeout (YES in S27), the processing proceeds to S33. On the other hand, the count is not timeout (NO in S27), the processing returns to S23 to repeat the process. The set value is capable of being set arbitrarily.

In S28, the response processing unit 313 sets the return time point in the slot system registered in the registration unit 311, and causes the UHF transmitter 33 to return the Ack signal at the unique return time point for each portable device 3 in the slot system.

In S29, when the LF receiver 32 receives the Challenge signal transmitted from the in-vehicle device 20 and specifying a subject portable device 3 (YES in S29), the processing proceeds to S30. On the other hand, when the Challenge signal specifying the subject portable device 3 is not received (NO in S29), the processing proceeds to S32.

In S30, the verification unit 312 encrypts the Challenge signal received in S29 using the common secret key stored in the registration unit 311 and the encryption algorithm common to the in-vehicle device 20. In S31, the response processing unit 313 causes the UHF transmitter 33 to transmit the code encrypted in S30 as the Response signal.

In S32, when the period during which the UHF transmitter 33 does not perform the transmission after the release of the sleep state of the portable device 3 exceeds the set value, that is, the count is timeout (YES in S32), the processing proceeds to S33. On the other hand, the count is not timeout (NO in S32), the processing returns to S29 to repeat the process. In S33, the portable device 3 is shifted to the sleep state, and the processing returns to S21 to repeat the processing.

Next, an example of a sequence until the verification is established in a Challenge and Response method in the authentication system 1 will be described with reference to the schematic diagram of FIG. 9. Here, for the sake of convenience, the description will be made on the assumption that the LF antennas of the vehicle unit 2 are the door antenna 24a by the driver's seat and the door antenna 24b by the passenger's seat. Further, the description will be made on the assumption that the portable devices 3 are the portable devices 3a and 3b registered in the registration unit 214 and a portable device for another vehicle not registered in the registration unit 214 (hereinafter, unregistered portable device).

First, a case where neither the portable devices 3a and 3b nor the unregistered portable device exists within the communication range of the door antenna 24a and the door antenna 24b will be described. As shown in FIG. 9, when it is in the polling period, both the door antenna 24a and the door antenna 24b simultaneously transmit the Wake signal including the designation information designating the simultaneous system. Also, the power of the UHF receiver 23 is turned on so that the UHF receiver 23 is activated. The portable devices 3a and 3b and the unregistered portable device do not exist within the communication range of the door antenna 24a and the door antenna 24b. Thus, the Ack signal is not returned. Since the Ack signal is not returned, the UHF receiver 23 does not receive a radio wave and the operation switch unit 213 causes the UHF receiver 23 to turn off the power so as to stop the operation. Thus, the configuration can reduce the dark current of the in-vehicle vehicle 20, and search for the genuine portable devices 3 around the vehicle collectively.

Next, a case where the portable devices 3a and 3b and the unregistered portable device exist within the communication range of the door antenna 24a will be described. As shown in FIG. 9, when it is in the polling period, both the door antenna 24a and the door antenna 24b simultaneously transmit the Wake signal including the designation information designating the simultaneous system. Also, the power of the UHF receiver 23 is turned on so that the UHF receiver 23 is activated. Since the portable devices 3a and 3b exist within the communication range of the door antenna 24a, the portable devices 3a and 3b return the Ack signals at the same return time point. On the other hand, the unregistered portable device exists within the communication range of the door antenna 24a, but the unregistered portable device does not return the Ack signal because the verification using the vehicle identification code included in the Wake signal is not established.

Since the Ack signal is returned, the UHF receiver 23 receives the radio wave and the operation switch unit 213 keeps the power of the UHF receiver 23 on so as to continue the operation. Even when the waveforms of the Ack signals returned from the portable devices 3a and 3b overlap, the UHF receiver 23 can receive the radio wave. As long as the genuine portable device 3 exists within the communication range, the operation of the UHF receiver 23 is continued.

Figure 9:
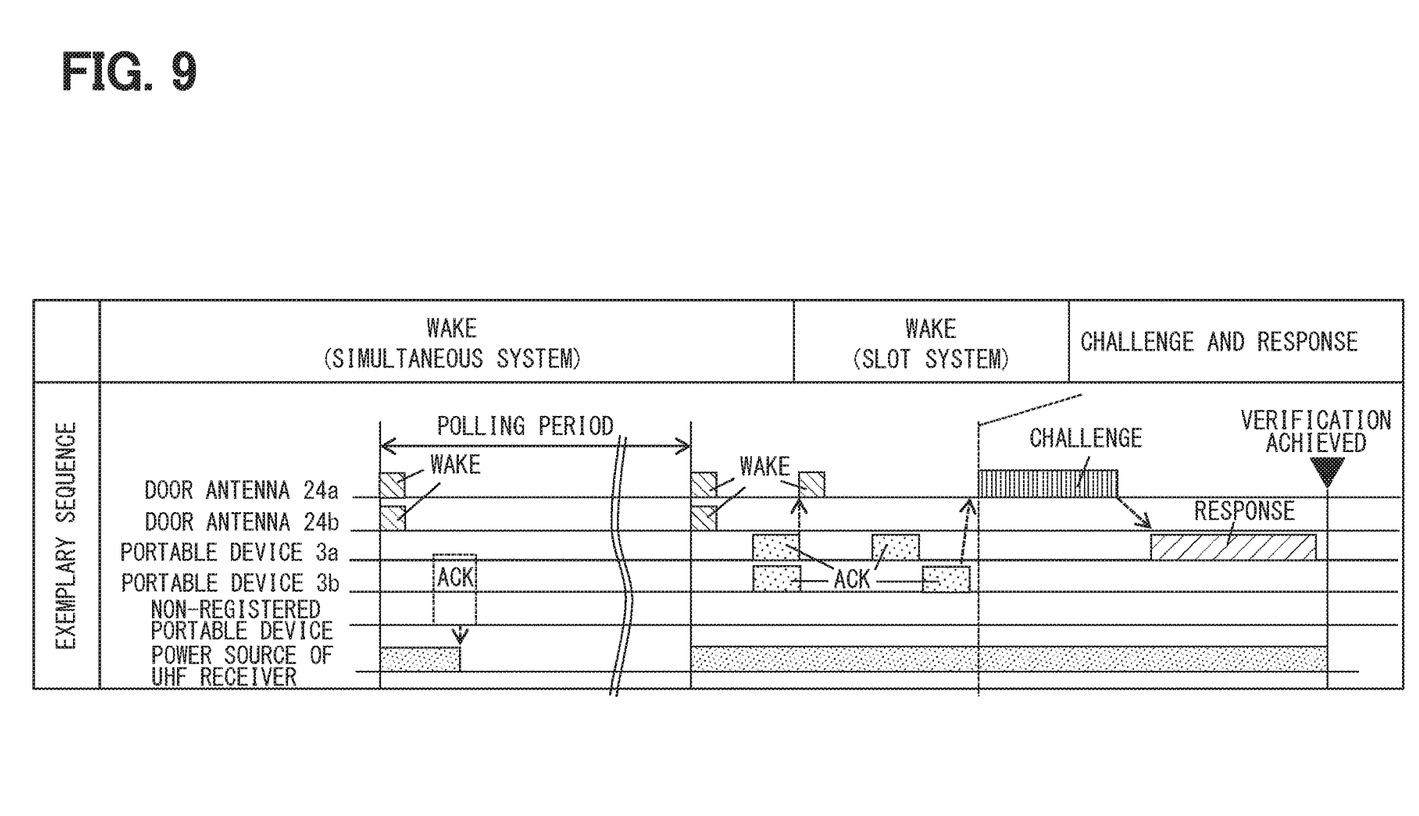
FIG. 9 is a diagram showing an example of a sequence until a verification is established in a Challenge and Response method in the authentication system.

When the UHF receiver 23 receives the radio wave, as shown in FIG. 9, the Wake signal including the designation information designating the slot system is transmitted in the order from the door antenna 24a to the door antenna 24b. In the example of FIG. 9, the Wake signal including the designation information designating the slot system is transmitted in the order from the door antenna 24a to the door antenna 24b until the returned Ack signal is received by the UHF receiver 23. In this case, since the portable devices 3a and 3b are within the communication range of the door antenna 24a, each of the portable devices 3a and 3b transmits the Ack signal at the unique time point in response to the Wake signal including the designation information designating the slot system transmitted from the door antenna 24a. The Ack signal returned from each of the portable devices 3a and 3b at the unique return time point is received by the UHF receiver 23 with a time difference.

The door antenna 24a that transmitted the Wake signal corresponding to the Ack signal having been received by the UHF receiver 23 transmits the Challenge signal that designates the portable device 3. Here, the door antenna 23 transmits the Challenge signal designating the portable device 3a. The portable device 3a returns the Response signal in response to the Challenge signal. Then, when the verification based on the Response signal is established in the verification unit 215 of the in-vehicle device 20, the operation switch unit 213 turns off the power of the UHF receiver 23 so as to stop the operation. Here, for the sake of convenience, the explanation has been simplified. The door antenna 24a may transmit a Burst signal, which is for measuring RSSI (Received Signal Strength Indicator) in the portable device 3, after the door antenna 24a transmits the Challenge signal. After transmitting the Burst signal, the door antenna 24a returns the Response signal.

According to the first embodiment, when the LF transmitter 22 transmits the Wake signal, the LF transmitter 22 transmits the Wake signal including the designation information designating the portable device 3 to return the Ack signal in the simultaneous system. When the UHF receiver 23 does not receive a radio wave, the operation of the UHF receiver 23 is stopped. Therefore, when the portable device 3 does not exist within the communication range of the LF transmitter 22, the configuration can stop the operation of the UHF receiver 23 earlier than a case waiting for the return time points of the Ack signals of all the portable devices 3 registered in the registration unit 214 in the slot system. Thus, compared with the case where the operation of the UHF receiver 23 is stopped after waiting for the return time points of the Ack signals of all the portable devices 3 registered in the registration unit 214 and returned in the slot system, the configuration can shorten the period in which the UHF receiver 23 is operated and reduce the current consumption. On the other hand, when the UHF receiver 23 receives a radio wave, the LF transmitter 22 transmits the Wake signal including the designation information designating the portable device 3 to return the Ack signal in the slot system. Even when the multiple portable devices 3 exist within the communication range of the LF transmitter 22, the configuration can reduce the overlap of the waveforms of the Ack signals returned from the multiple portable devices 3. Thus, the in-vehicle device 20 can receive the Ack signal more accurately. As a result, it is possible to ensure the communication reliability and further reduce the current consumption.

According to the first embodiment, the LF transmitter 22 transmits the Wake signal including the designation information designating the simultaneous system to multiple areas of the LF antennas of the vehicle unit 2 at the same time. Thus, compared with the case where the signals are individually transmitted to each area, the configuration can shorten the period in which the UHF receiver 23 is operated and further reduce the current consumption.

Second Embodiment

In the first embodiment, the configuration is described in which the Wake signal has the same frame length even when the designation information included in the Wake signal is different, but the configuration is not limited thereto. For example, when the designation information included in the Wake signal is different, the frame length of the Wake signal may be different.

Third Embodiment

In the above-described embodiment, the configuration is described in which the designation information is assigned to a part of the bit width assigned to the vehicle identification code included in the conventional Wake signal that does not include the designation information. However, the configuration is not limited thereto. For example, a bit width for assigning the designation information may be added to the bit width assigned to the vehicle identification code included in the conventional Wake signal that does not include the designation information.

Fourth Embodiment

In the above-described embodiment, the transmission processing unit 211 causes the LF transmitter 22 to transmit the Wake signal including the designation information designating the simultaneous system to the multiple areas of the LF antennas of the vehicle unit 2 at the same time. However, the configuration is not limited thereto. For example, the transmission processing unit 211 may cause the LF transmitter 22 to sequentially transmit the Wake signal including the designation information designating the simultaneous system to the area of each LF antenna of the vehicle unit 2. Alternatively, the transmission processing unit 211 may cause the LF transmitter 22 to transmit the Wake signal including the designation information designating the simultaneous system to one of the multiple areas of the LF antennas of the vehicle unit 2.

In the configuration according to the fourth embodiment, when the portable device 3 does not exist within the communication range of the LF transmitter 22, the configuration can stop the operation of the UHF receiver 23 earlier than a case waiting for the return time points of the Ack signals of all the portable devices 3 registered in the registration unit 214 in the slot system. As a result, it is possible to ensure the communication reliability and further reduce the current consumption.

Fifth Embodiment

In the above-described embodiment, the configuration is described in which the authentication system 1 is applied to a vehicle. However, the authentication system 1 may be applied to a subject other than a vehicle. For example, the configuration may be applied to a house, a facility, or the like so as to be used for an authentication of locking and unlocking of door of the house, the facility, or the like.

A flowchart or a process of the flowchart described in the present disclosure includes multiple parts (or steps), and each part is expressed, for example, as S1. Furthermore, each part may be divided into multiple sub-parts, while the multiple parts may be combined into one part. Each of these sections may also be referred to as a circuit, a device, a module, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

Although the present disclosure has been described in accordance with the examples, it is understood that the disclosure is not limited to such examples or structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

What is claimed is:

1. An authentication system comprising:
an authentication target device used in an authentication target; and
a plurality of portable devices each carried by a user, wherein:
the authentication target device performs wireless communication with the plurality of portable devices and controls the authentication target by a verification via the wireless communication;
the authentication target device includes
an authentication target transmitter configured to transmit a radio wave carrying a signal,
an authentication target receiver configured to receive a radio wave carrying a signal, and
a registration unit configured to register the plurality of portable devices that are genuine;
the authentication target transmitter transmits a Wake signal for activating the plurality of portable devices prior to the verification;
the authentication target receiver is activated in response to the authentication target transmitter transmitting the Wake signal;
each of the plurality of portable devices includes
a portable device transmitter configured to transmit the radio wave carrying the signal, and
a portable device receiver configured to receive the radio wave carrying the signal;
the portable device transmitter returns an Ack signal as an acknowledgment in response to the portable device receiver receiving the Wake signal;
the portable device transmitter is configured to switch between a slot system and a simultaneous system;
in the slot system, the plurality of portable devices registered in the registration unit are given slot return time points for returning the Ack signals in response to the Wake signal at different time points;
in the simultaneous system, the plurality of portable devices registered in the registration unit are given a simultaneous return time point for returning the Ack signals in response to the Wake signal at a same time point;

the Wake signal includes a first Wake signal, which includes designation information designating each of the plurality of portable devices to return the Ack signal in the simultaneous system and a second Wake signal, which includes designation information designating each of the plurality of portable devices to return the Ack signal in the slot system;

a period from reception of the first Wake signal to the simultaneous return time point is shorter than a period from reception of the second Wake signal to a last one of the slot return time points;

as transmission of the Wake signal for activating the plurality of portable devices, (i) when the authentication target receiver does not receive the radio wave in response to the transmission of the first Wake signal, an operation of the authentication target receiver is stopped and the authentication target transmitter refrains from transmitting the second Wake signal, and (ii) when the authentication target receiver receives the radio wave in response to the transmission of the first Wake signal, the authentication target transmitter transmits the second Wake signal;

when the portable device receiver receives the first Wake signal, the portable device transmitter transmits the Ack signal at the simultaneous return time point; and when the portable device receiver receives the second Wake signal, the portable device transmitter transmits the Ack signal at a given time point among the slot return time points.

2. The authentication system according to claim 1, wherein:
the Wake signal has a frame having a frame length; and
the frame length of the first Wake signal is same as the frame length of the second Wake signal.

3. The authentication system according to claim 2, wherein:
in the frame, the Wake signal includes identification information for identifying the authentication target device that transmits the Wake signal;
the Wake signal includes a third Wake signal that does not include the designation information; and
the designation information in the first Wake signal and the second Wake signal is stored in a part of the frame that stores the identification information in the third Wake signal.

4. The authentication system according to claim 1, wherein:
the authentication target has a plurality of antennas having different communication areas;
the authentication target transmitter causes the plurality of antennas to transmit the radio wave;
in a case where the authentication target transmitter causes each of the plurality of antennas to simultaneously transmit the first Wake signal, (i) when the authentication target receiver does not receive the radio wave, the operation of the authentication target transmitter is stopped, and (ii) when the authentication target receiver receives the radio wave, the authentication target transmitter causes each of the plurality of antennas to sequentially transmit the second Wake signal until the authentication target receiver receives the Ack signal.

5. The authentication system according to claim 1, wherein:
the authentication target device is used in a vehicle; and
the authentication target transmitter periodically transmits the Wake signal for activating the plurality of portable devices prior to the verification when the vehicle is parked.

6. An authentication target device that is used in an authentication target, is configured to perform wireless communication with a plurality of portable devices each carried by a user, and is configured to control the authentication target by a verification via the wireless communication, the authentication target device comprising:
an authentication target transmitter configured to transmit a radio wave carrying a signal;
an authentication target receiver configured to receive a radio wave carrying a signal returned from each of the plurality of portable devices in response to the authentication target transmitter transmitting the signal carried by the radio wave; and
a registration unit configured to register the plurality of portable devices that are genuine, wherein:
the authentication target transmitter transmits a Wake signal for activating the plurality of portable devices prior to the verification;
the authentication target receiver is activated in response to the authentication target transmitter transmitting the Wake signal;
the Wake signal includes a first Wake signal, which includes designation information designating each of the plurality of portable devices to return, as an acknowledgment, an Ack signal in a simultaneous system, and a second Wake signal, which includes designation information designating each of the plurality of portable devices to return the Ack signal in a slot system;
in the slot system, the plurality of portable devices registered in the registration unit are given slot return time points for returning the Ack signals in response to the Wake signal at different time points;
in the simultaneous system, the plurality of portable devices registered in the registration unit are given a simultaneous return time point for returning the Ack signals in response to the Wake signal at a same time point;
a period from reception of the first Wake signal to the simultaneous return time point is shorter than a period from reception of the second Wake signal to a last one of the slot return time points; and
as transmission of the Wake signal for activating the plurality of portable devices, (i) when the authentication target receiver does not receive the radio wave in response to the transmission of the first Wake signal, an operation of the authentication target receiver is stopped and the authentication target transmitter refrains from transmitting the second Wake signal, and (ii) when the authentication target receiver receives the radio wave in response to the transmission of the first Wake signal, the authentication target transmitter transmits the second Wake signal.

7. An authentication target device that is used in an authentication target, is configured to perform wireless communication with a plurality of portable devices each carried by a user, and is configured to control the authentication target by a verification via the wireless communication, the authentication target device comprising:
an authentication target transmission circuit configured to transmit a radio wave carrying a signal;
an authentication target reception circuit configured to receive a radio wave carrying a signal returned from each of the plurality of portable devices in response to the authentication target transmission circuit transmitting the signal carried by the radio wave; and a processor configured to register the plurality of portable devices that are genuine, wherein:

the authentication target transmission circuit transmits a Wake signal for activating the plurality of portable devices prior to the verification;

the authentication target reception circuit is activated in response to the authentication target transmission circuit transmitting the Wake signal;

the Wake signal includes a first Wake signal, which includes designation information designating each of the plurality of portable devices to return, as an acknowledgment, an Ack signal in a simultaneous system, and a second Wake signal, which includes designation information designating each of the plurality of portable devices to return the Ack signal in a slot system;

in the slot system, the plurality of portable devices registered in the processor are given slot return time points for returning the Ack signals in response to the Wake signal at different time points;

in the simultaneous system, the plurality of portable devices registered in the processor are given a simultaneous return time point for returning the Ack signals in response to the Wake signal at a same time point;

a period from reception of the first Wake signal to the simultaneous return time point is shorter than a period from reception of the second Wake signal to a last one of the slot return time points; and as transmission of the Wake signal for activating the plurality of portable devices, (i) when the authentication target reception circuit does not receive the radio wave in response to the transmission of the first Wake signal, an operation of the authentication target reception circuit is stopped and the authentication target transmission circuit refrains from transmitting the second Wake signal, and (ii) when the authentication target reception circuit receives the radio wave in response to the transmission of the first Wake signal, the authentication target transmission circuit transmits the second Wake signal.

* * * * *